US009483458B2

(12) United States Patent
Presler-Marshall et al.

(10) Patent No.: US 9,483,458 B2
(45) Date of Patent: *Nov. 1, 2016

(54) METHOD FOR LOGICAL ORGANIZATION OF WORKSHEETS

(71) Applicant: International Business Machines Corporation, Armonk, NY (US)

(72) Inventors: Martin J. C. Presler-Marshall, Chapel Hill, NC (US); Hunter K. Presnall, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,745

(22) Filed: Mar. 10, 2015

(65) Prior Publication Data

US 2015/0309979 A1    Oct. 29, 2015

Related U.S. Application Data

(63) Continuation of application No. 14/263,292, filed on Apr. 28, 2014.

(51) Int. Cl.
*G06F 15/00*     (2006.01)
*G06F 17/24*     (2006.01)
*G06F 17/21*     (2006.01)

(52) U.S. Cl.
CPC ......... *G06F 17/246* (2013.01); *G06F 17/218* (2013.01)

(58) Field of Classification Search
CPC .............. G06F 17/2235; G06F 17/30882; G06F 17/2247; G06F 17/3089; G06F 17/212; G06F 17/24

USPC ................. 715/205, 255, 211, 202
See application file for complete search history.

(56) References Cited

U.S. PATENT DOCUMENTS

| | | | | | |
|---|---|---|---|---|---|
| 5,312,478 | A * | 5/1994 | Reed | ............ | G06F 17/246 715/205 |
| 5,396,587 | A * | 3/1995 | Reed | ............ | G06F 17/246 715/219 |
| 5,926,822 | A * | 7/1999 | Garman | ............ | G06F 17/246 715/201 |
| 6,411,313 | B1 * | 6/2002 | Conlon | ............ | G06F 17/246 715/202 |
| 6,871,182 | B1 * | 3/2005 | Winnard | ............ | G06Q 10/06 705/7.37 |
| 7,085,734 | B2 * | 8/2006 | Grant | ............ | G06Q 10/06 705/20 |
| 7,124,373 | B1 * | 10/2006 | Patil | ............ | G06F 3/0486 715/205 |
| 7,155,665 | B1 * | 12/2006 | Browne | ............ | G06F 17/246 715/243 |
| 7,197,696 | B1 * | 3/2007 | Muzumdar | ............ | G06Q 10/10 707/999.004 |

(Continued)

OTHER PUBLICATIONS

List of IBM Patents or Patent Applications Treated as Related, Mar. 25, 2015.

*Primary Examiner* — Scott Baderman
*Assistant Examiner* — Hassan Mrabi
(74) *Attorney, Agent, or Firm* — Steve Kurlowecz; Edell, Shapiro & Finnan, LLC

(57) ABSTRACT

According to one embodiment of the present invention, methods, systems and computer-readable media of accessing data within a spreadsheet are provided. A set of attributes is assigned to each worksheet of a plurality of worksheets within the spreadsheet. One or more worksheets may be identified by comparing the set of attributes for each worksheet to one or more attributes specified within a request for data, and the identified worksheets may be displayed.

7 Claims, 9 Drawing Sheets

(56) References Cited

U.S. PATENT DOCUMENTS

| | | | | |
|---|---|---|---|---|
| 7,308,440 B2* | 12/2007 | Rajarajan | | G06F 9/4443 707/706 |
| 7,523,395 B1* | 4/2009 | Namait | | G06F 17/246 715/212 |
| 7,991,804 B2* | 8/2011 | Battagin | | G06F 17/246 |
| 8,321,780 B2 | 11/2012 | Erwig et al. | | |
| 8,676,689 B1* | 3/2014 | Whelan | | G06Q 40/12 705/36 R |
| 8,863,156 B1* | 10/2014 | Lepanto | | G06F 9/44521 719/328 |
| 8,972,437 B2* | 3/2015 | Hoellwarth | | G06F 17/30917 707/769 |
| 9,170,990 B2* | 10/2015 | Von Weihe | | G06F 17/2288 |
| 2002/0010743 A1* | 1/2002 | Ryan | | G06F 17/246 709/205 |
| 2002/0013786 A1* | 1/2002 | Machalek | | G06Q 10/10 715/209 |
| 2002/0129053 A1* | 9/2002 | Chan | | G06F 17/246 715/213 |
| 2002/0184261 A1* | 12/2002 | Yamane | | G06F 17/246 715/217 |
| 2003/0110191 A1* | 6/2003 | Handsaker | | G06F 17/246 715/212 |
| 2004/0205509 A1* | 10/2004 | Lou | | G06F 17/2211 715/229 |
| 2004/0227759 A1* | 11/2004 | McKnight | | G06T 11/206 345/440 |
| 2005/0027172 A1* | 2/2005 | Benavides | | G06F 19/3431 600/300 |
| 2005/0039113 A1* | 2/2005 | Balducci | | G06F 17/2247 715/239 |
| 2006/0089924 A1* | 4/2006 | Raskutti | | G06F 17/3071 |
| 2007/0011211 A1* | 1/2007 | Reeves | | G06F 17/246 |
| 2007/0143661 A1* | 6/2007 | Machalek | | G06Q 10/10 715/206 |
| 2007/0162483 A1* | 7/2007 | Sasaki | | G06F 17/246 |
| 2007/0168891 A1* | 7/2007 | Damery | | G10L 13/00 715/865 |
| 2008/0104032 A1* | 5/2008 | Sarkar | | G06F 17/3089 |
| 2008/0222508 A1* | 9/2008 | Nguyen | | G06F 17/2211 715/212 |
| 2008/0222509 A1* | 9/2008 | Nguyen | | G06F 17/246 715/212 |
| 2008/0222510 A1* | 9/2008 | Nguyen | | G06Q 10/10 715/212 |
| 2008/0235579 A1* | 9/2008 | Champion | | G06F 17/243 715/273 |
| 2009/0144313 A1* | 6/2009 | Hodge | | G06F 17/30592 |
| 2010/0174678 A1* | 7/2010 | Massand | | G06F 17/2288 707/610 |
| 2012/0231441 A1* | 9/2012 | Parthasarathy | | G09B 7/02 434/362 |
| 2013/0086459 A1* | 4/2013 | Folting | | G06F 17/246 715/212 |
| 2013/0111319 A1 | 5/2013 | Lin et al. | | |
| 2013/0124957 A1* | 5/2013 | Oppenheimer | | G06F 17/30964 715/212 |
| 2013/0159832 A1* | 6/2013 | Ingargiola | | G06Q 40/00 715/220 |
| 2013/0174025 A1* | 7/2013 | Lee | | G06F 17/24 715/251 |
| 2013/0174032 A1* | 7/2013 | Tse | | G06F 17/212 715/273 |
| 2014/0075278 A1* | 3/2014 | Bornea | | G06F 17/2745 715/212 |
| 2014/0089022 A1* | 3/2014 | Cody | | G06Q 10/06 705/7.11 |
| 2014/0229222 A1* | 8/2014 | Shakil | | G06Q 10/06313 705/7.23 |
| 2014/0244416 A1* | 8/2014 | Venkat | | G06Q 30/0603 705/26.1 |
| 2015/0199324 A1* | 7/2015 | Nishioka | | G06F 17/245 715/212 |
| 2015/0309980 A1* | 10/2015 | Glass | | G06F 17/246 715/219 |

* cited by examiner

| 710(1) | |
|---|---|
| RESPONSE TIME | |
| 3.2s | ATTRIBUTE 1 |
| 4.2s | ATTRIBUTE 2 |
| 8.9s | ATTRIBUTE 3 |
| 3.2s | ATTRIBUTE 4 |
| ... | |

| 710(2) | |
|---|---|
| RESPONSE TIME | |
| 4.2s | ATTRIBUTE 1 |
| 4.2s | ATTRIBUTE 2 |
| 5.7s | ATTRIBUTE 3 |
| 3.2s | ATTRIBUTE 4 |
| ... | |

| 710(3) | |
|---|---|
| RESPONSE TIME | |
| 3.2s | ATTRIBUTE 1 |
| 7.2s | ATTRIBUTE 2 |
| 5.9s | ATTRIBUTE 3 |
| 3.2s | ATTRIBUTE 4 |
| ... | |

| 710(4) | |
|---|---|
| RESPONSE TIME | |
| 3.2s | ATTRIBUTE 1 |
| 4.1s | ATTRIBUTE 2 |
| 5.9s | ATTRIBUTE 3 |
| 2.2s | ATTRIBUTE 4 |
| ... | |

| 710(5) | |
|---|---|
| RESPONSE TIME | |
| 9.2s | ATTRIBUTE 1 |
| 4.2s | ATTRIBUTE 2 |
| 5.8s | ATTRIBUTE 3 |
| 3.2s | ATTRIBUTE 4 |
| ... | |

| 710(6) | |
|---|---|
| RESPONSE TIME | |
| 3.6s | ATTRIBUTE 1 |
| 4.2s | ATTRIBUTE 2 |
| 3.9s | ATTRIBUTE 3 |
| 3.2s | ATTRIBUTE 4 |
| ... | |

FIG.7

METHOD FOR LOGICAL ORGANIZATION OF WORKSHEETS

CROSS-REFERENCE TO RELATED APPLICATIONS

This application is a continuation of U.S. patent application Ser. No. 14/263,292, entitled "METHOD FOR LOGICAL ORGANIZATION OF WORKSHEETS" and filed Apr. 28, 2014, the disclosure of which is incorporated herein by reference in its entirety.

BACKGROUND

1. Technical Field

Present invention embodiments relate to management of data, and more specifically, to identifying and displaying relevant data from a plurality of worksheets.

2. Discussion of the Related Art

Worksheets in a spreadsheet window may be presented in a list (e.g., tabs) along the bottom of the spreadsheet window. To identify data of interest, a user may manually scroll through the list.

Worksheets may be shown or hidden within a spreadsheet. Additionally, spreadsheet constructs known as "pivot tables", may use conditions based on specific columns in the rows of data being managed to extract data from tables, group the results, and apply mathematical functions to the resulting rows.

SUMMARY

According to embodiments of the present invention, computer-implemented methods, systems and computer-readable media of accessing data within a spreadsheet are provided. A set of attributes is assigned to each worksheet of a plurality of worksheets within the spreadsheet. One or more worksheets may be identified by comparing the set of attributes for each worksheet to one or more attributes specified within a request for data, and the identified worksheets may be displayed.

These and other aspects, features and advantages of the present invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

Generally, like reference numerals in the various figures are utilized to designate like components.

FIG. 7 shows an example of tiled worksheets, according to an embodiment of the present invention.

DETAILED DESCRIPTION

According to embodiments of the present invention, computer-implemented methods, systems, and computer program products for accessing data within a spreadsheet including a plurality of worksheets are provided. A set of attributes is assigned to each worksheet within the spreadsheet. One or more worksheets is identified by comparing the set of attributes for each worksheet to one or more attributes specified within a request for data, and the identified worksheets are displayed.

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others. The techniques presented herein are not to be limited to the example embodiments set forth herein.

Figure 1:
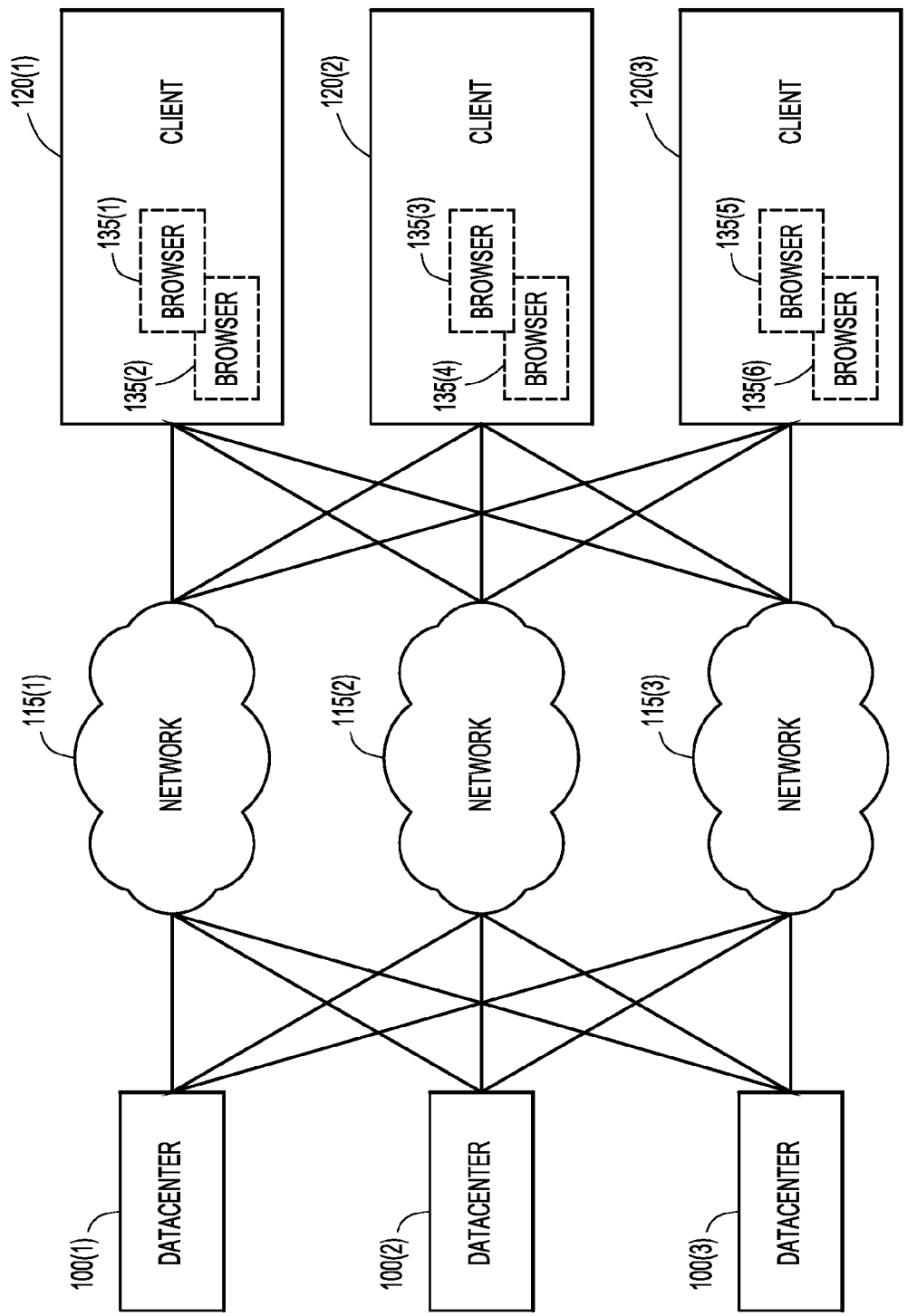
FIG. 1 is an example computing environment according to an embodiment of the invention.

With reference now to FIG. 1, an example computing environment is shown for generating data to be stored in a spreadsheet. Multiple client systems 120(1)-(3) with multiple browsers 135(1)-135(6) may communicate with multiple datacenters, 100(1)-100(3), through multiple networks 115(1)-115(3). Each browser may be associated with an initial condition. Web browsers may include any suitable web browser, including Internet Explorer®, Firefox®, etc. or the like. Initial conditions may be applied to the web browser, and may include: starting with an empty browser cache; starting with a populated browser cache; etc. It is noted that present embodiments may be applied to any computing environment, in which data is generated and stored within a spreadsheet. Accordingly, the computing environment may consist of any number of computing devices (from a single computing device to a large number of computing devices) capable of generating or collecting data. In some embodiments, the data generated by the computing environment may comprise a large number of individual data points or measurements.

In this example, datacenters 100(1)-100(3) and client systems 120(1)-120(3) may be remote from each other and communicate over one or more networks 115(1)-115(3). The network may be implemented by any number of any suitable communications media (e.g., wide area network (WAN), local area network (LAN), Internet, Intranet, etc.). Alternatively, datacenters 100(1)-100(3) and client systems 120(1)-120(3) may be local to each other, and communicate via any appropriate local communication medium (e.g., local area network (LAN), hardwire, wireless link, Intranet, etc.).

Client systems 120(1)-120(3) enable users to collect data (e.g., performance data, transaction data, etc.) for analysis from datacenters 100(1)-100(3). Collected data may be stored in spreadsheets, stored local to or remote from client systems 120(1)-120(3). The client systems may present a graphical user (e.g., GUI, etc.) or other interface (e.g., command line prompts, menu screens, etc.) to solicit information from users pertaining to attribute information, filtering and analysis, and may display information including filtering results (e.g., attributes, collected data, filtering criteria, etc.).

A module may include one or more modules or units to perform the various functions of present invention embodiments described below. The various modules (e.g., assigning attributes, entering filtering criteria, specifying display criteria, and filtering) may be implemented by any combination of any quantity of software and/or hardware modules or units, and may reside within memory 630 of the client systems for execution by processor 620.

One or more client systems may collect data from multiple computing environments located in one or more geographic regions. In other embodiments, one or more client systems may generate a large volume of data. Such data may include any type of data, generated or collected by one or more computing devices.

As an example use case, large amounts of data may be collected by a client device as shown in FIG. 1. It is noted that this use case is provided for contextual purposes only, and is not intended to limit the scope of the invention to the specific embodiments provided herein. In this use case, performance data may include data associated with transactions, such as response time, etc., or any other type of data associated with performance or computing characteristics of a datacenter. In some embodiments, a use case may include measuring response times associated with multiple transactions, e.g., five transactions, etc. Many other use cases are understood to fall within the scope of the embodiments presented herein and may include any number of computing devices generating or collecting large volumes of data for storage on tabs of a spreadsheet. Measurements may be run multiple times in order to generate a sufficient amount of data for statistical analysis (e.g., averaging, standard deviation, etc.).

An example computing environment, as shown in FIG. 1, may include one or more client(s), one or more datacenter(s), one or more network(s), a web browser, and associated initial conditions for the web browser. For example, a system including 8 clients, 2 data centers, 2 web browsers, and 2 initial conditions, leads to at least 64 different configurations, each configuration associated with 50-100 individual data points (e.g., 5 transactions×10-20 runs). Given that measurements will be performed on an ongoing basis, a large number of data points may be generated, e.g., 6,400 data points for each series of measurements. Present invention embodiments may be applied to any amount of data, to identify relevant data.

Traditional methods of storing data, e.g., in a spreadsheet, etc., allow for mathematical manipulation of the data, visualization using graphs and highlighting, and so forth. Each series of measurements may be stored in a worksheet within one spreadsheet, with rows in each worksheet storing individual results. For example, a spreadsheet may have worksheets including numerous types of data. Continuing with the example embodiments presented herein, each data type of the data stored in the spreadsheet may comprise information pertaining to determining performance, such as: (a) Real-time Transport Protocol (RTP) client, United States (US) datacenter, Internet Explorer® 8 (IE8), empty cache; (b) RTP client, US datacenter, IE8, primed cache; (c) Dublin client, US datacenter, IE8, empty cache; and (d) Dublin client, US datacenter, IE8, primed cache.

Worksheets may be accessed by selecting a corresponding tab. Tabs may be used to access multiple worksheets in a single spreadsheet, and are generally represented by a row along the bottom of the spreadsheet window. Each tab may be assigned a name, and a user may switch tabs (worksheets) by selection of a tab. Many other arrangements of tabs, as well as ways of switching between tabs, are understood to fall within the scope of the embodiments presented herein. Moreover, worksheets may be displayed in any number of arrangements. For example, in some embodiments, worksheets may be displayed in a tiled or multi-window display, and data from multiple worksheets can be viewed simultaneously. Spreadsheet graphs and formulae may also span multiple worksheets, if desired.

In a spreadsheet with a relatively small number of worksheets, a user can organize their data using tabs to examine and compare data. For example, by displaying multiple worksheets simultaneously, a user may visually compare and contrast data.

However, storing data in such a manner does not easily scale to large amounts of data for specific comparisons. Continuing with the example embodiment presented herein, if the latest set of measurements for "RTP client, US datacenter, IE8, primed cache" show a significant performance change, a user may wish to analyze and compare the data against: (a) other RTP measurements; (b) other measurements against the US datacenter, (c) other measurements with a primed cache; (d) other RTP measurements against the US datacenter, etc., to determine, in each case, whether any significant differences exist.

Figure 2:
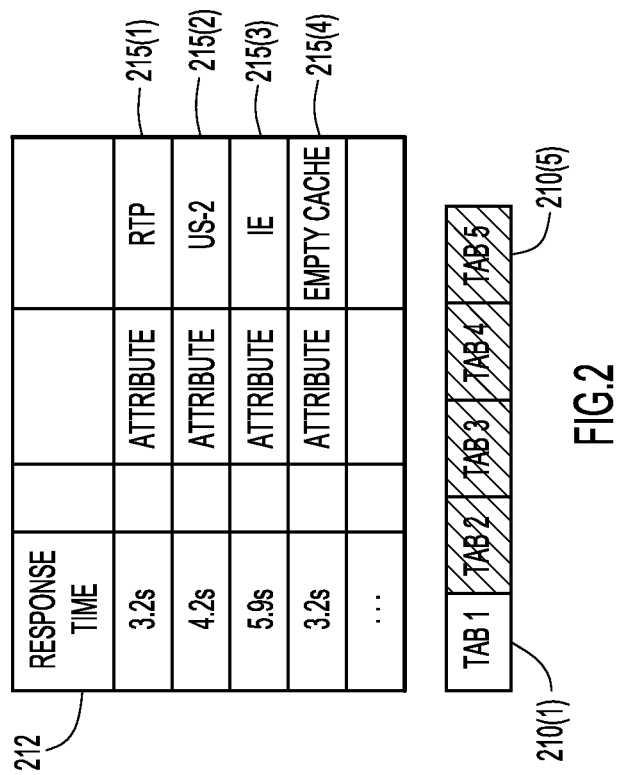
FIG. 2 is an example spreadsheet, showing storage of attributes in a worksheet, according to an embodiment of the invention.

Referring to FIG. 2, present invention embodiments include assigning attributes to each worksheet to manage the display of data associated with the worksheets. Attributes may include key-value pairs, tags, etc. Each worksheet (tab) of a spreadsheet may be associated with one or more attributes. A key-value pair may be, e.g., a tuple including a <key name, value> pair. In FIG. 2, "Tab 1" 210(1) is selected from a plurality of tabs 210(1)-210(5). Continuing with the example presented herein, the performance data of Tab 1 includes response times 212 associated with (one or more) transactions. Attributes have been added to indicate information specific to this set of measurements. For example, attribute 215(1) indicates a particular client, attribute 215(2) indicates a particular datacenter, attribute 215(3) indicates a particular web browser, and attribute 215(4) indicates a particular initial condition for the web browser. Attributes may be associated with a spreadsheet in any manner of ways, e.g., rows, columns, metadata, etc., and may be visible or hidden. Attributes may include any manner of information used to characterize data within a spreadsheet. Present invention embodiments are not limited to a specific number of attributes, and may include any number of attributes.

Figure 3A:
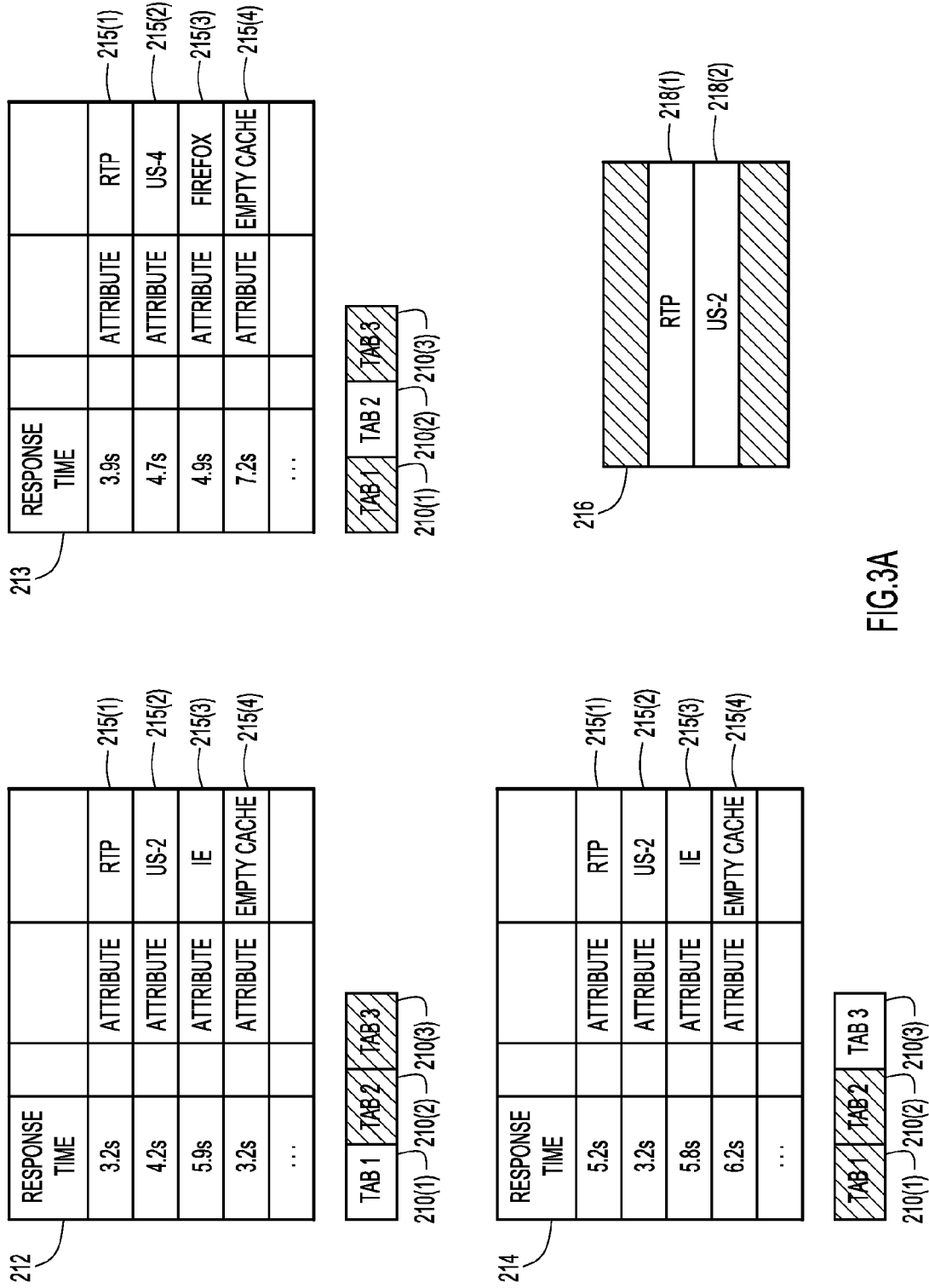
FIGS. 3A-B show an example of filtering worksheets, according to an embodiment of the invention.
Figure 3B:
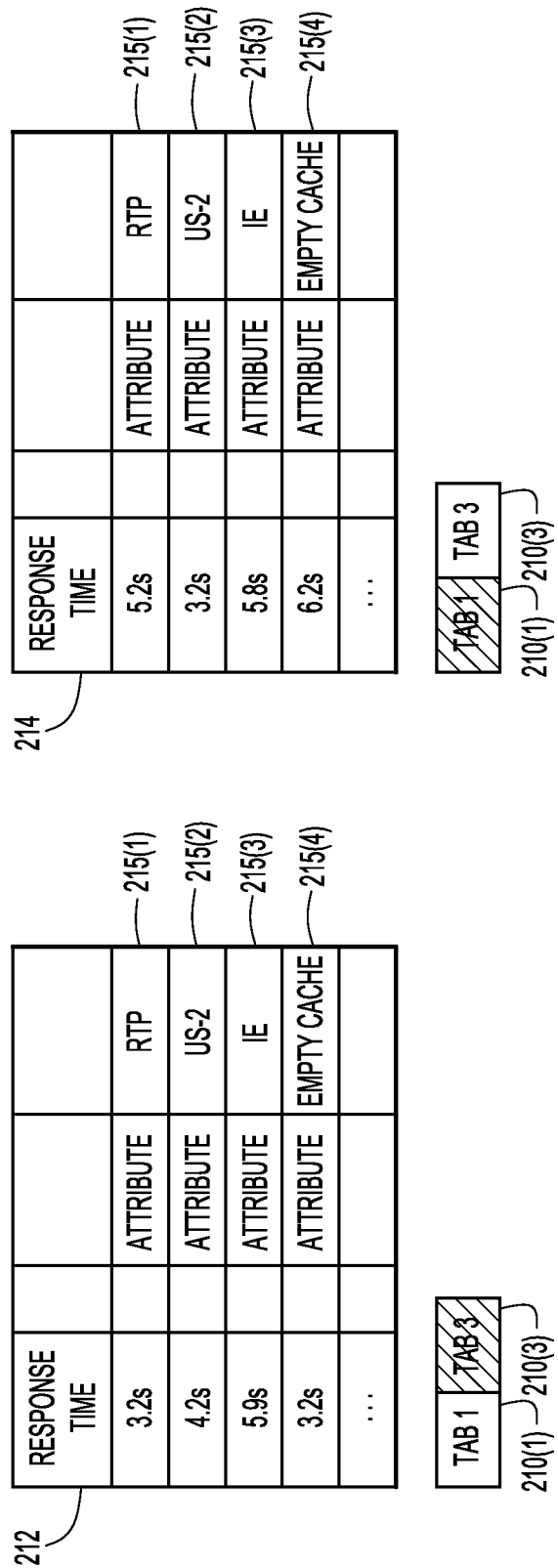

Referring to FIGS. 3A-B, present invention embodiments also comprise filtering data to identify worksheets which meet specified criteria. By filtering data based upon one or more attributes, a subset of data may be identified. Only worksheets which match the specified filtering criteria will be displayed.

Continuing with the example presented herein, FIG. 3A shows three different tabs 212-214: Tab 1 210(1), Tab 2 210(2), and Tab 3 210(3), comprising response times and associated attributes 215(1)-215(4). The selected tab is highlighted, while unselected tabs are shaded. Criteria for a filtering operation is shown in interface 216, with filtering field 218(1) corresponding to client "RTP" and filtering field 218(2) corresponding to datacenter "US-2". As presented herein, only attributes which match these two filtering fields will be selected for display.

Referring now to FIG. 3B, Tabs 1 and 3 were selected by the filtering operation of FIG. 3A, based upon matching attributes. Notably, Tab 2 was not selected for display, since the datacenter attribute of "US-4" did not match the specified filtering criteria.

Figure 4:
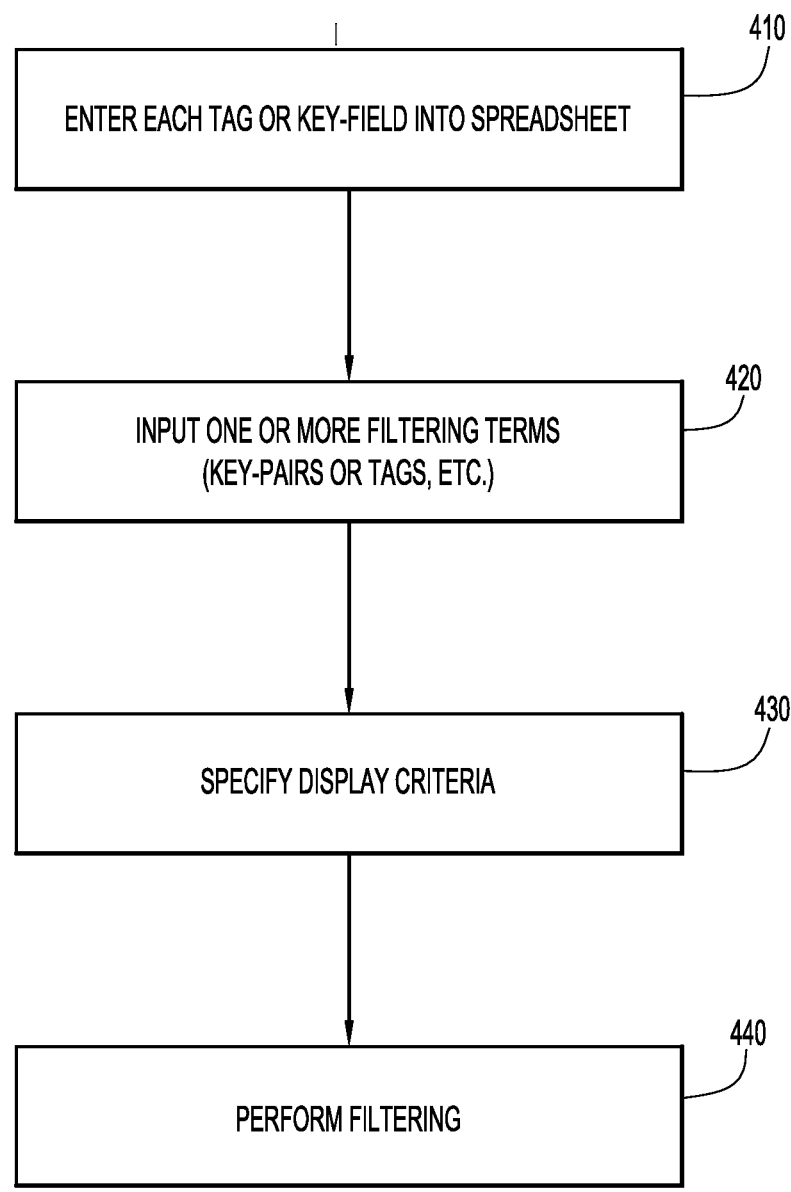
FIG. 4 is an example of various functional modules that a user may interact with to identify relevant data according to an embodiment of the invention.

FIG. 4 shows various functional modules generally representing the embodiments presented herein. At 410, a user may enter through a dialog one or more attributes to be assigned to a worksheet. Attributes may include tags, key-value pairs, etc. Attributes may be stored within in the worksheet itself, or within any other element associated with the worksheet. At 420, a user may select or enter through a dialog one or more attributes to perform filtering on the plurality of worksheets. Attributes may be selected via a Graphical User Interface (GUI), command line, or any other input mechanism as disclosed herein. In some embodiments, a user may specify conditions in queries, to perform Boolean-type operations, etc. At 430, a user may choose to specify how filtered worksheets will be displayed. For example, the worksheets may be displayed in a single window with tab selection on the bottom, multiple windows tiled on the screen, or multiple windows "stacked" on the screen, etc. Additionally, a user may specify a set of conditions to order the resulting worksheets. For example, the user might wish to have the matching set of worksheets sorted by a particular attribute type (e.g., browser type, measurement location, or some other criteria), by date, etc. At 440, a user may issue a command to perform the filtering operation, and display the relevant results.

Figure 5:
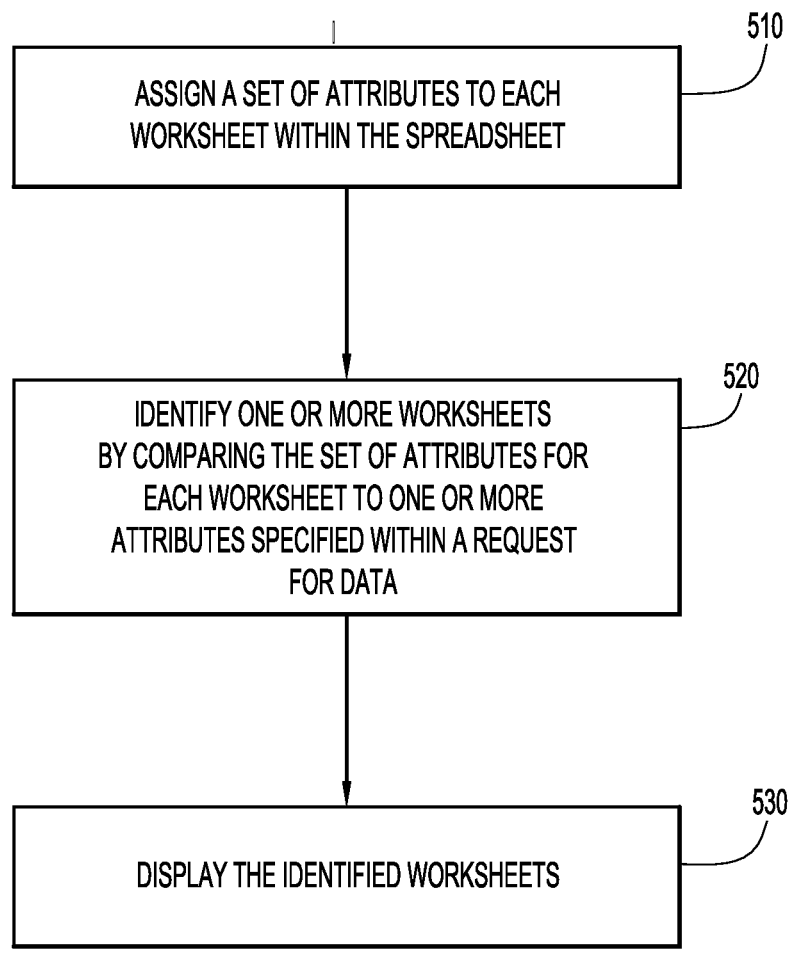
FIG. 5 is a flow diagram of example operations showing identification of relevant data according to an embodiment of the invention.

FIG. 5 shows a flowchart generally illustrating present invention embodiments. At operation 510, a set of attributes are assigned to each worksheet within the spreadsheet. At operation 520, one or more worksheets are identified by comparing the set of attributes for each worksheet to one or more attributes specified within a request for data. At operation 530, the identified worksheets are displayed.

Figure 6:
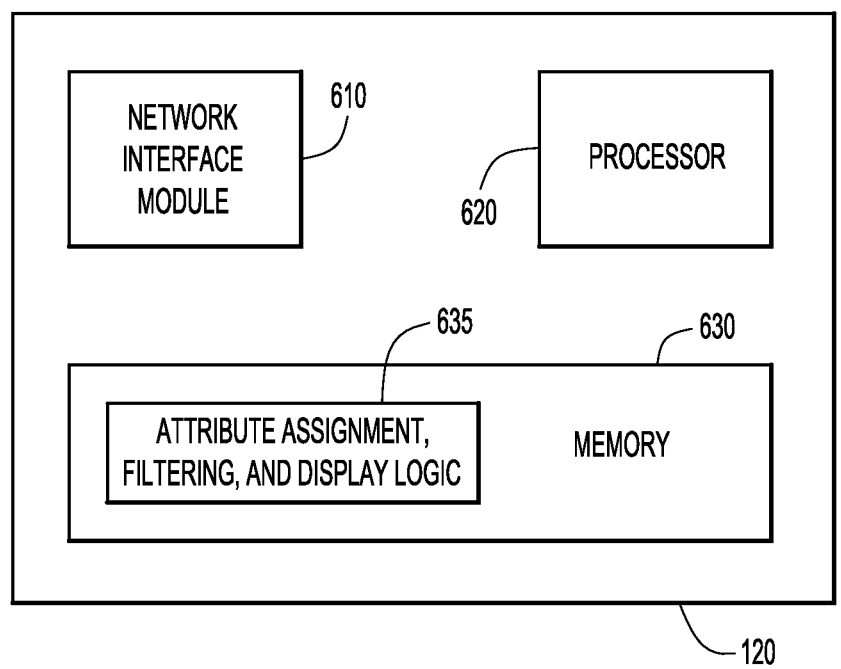
FIG. 6 shows an example apparatus for a client device, according to an embodiment of the present invention.

Referring to FIG. 6, an example embodiment of a client 120 may comprise a network interface 610, a processor 620 and a memory 630. The network interface unit 610 is configured to enable network communications over network 115(1)-115(3), e.g., to facilitate communication between one or more computing devices, e.g., any of datacenters 100(1)-100(3) and a client.

As depicted in FIG. 6, client systems 120(1)-120(3) may be implemented by any conventional or other computer systems preferably equipped with a display or monitor, a base (e.g., including at least one processor 620, one or more memories 630 and/or internal or external network interfaces or communications devices 610 (e.g., modem, network cards, etc.)), optional input devices (e.g., a keyboard, mouse or other input device), and any commercially available and custom software (e.g., server/communications software, module, browser/interface software, etc.). The processor 620 may be embodied by one or more microprocessors or microcontrollers, and executes computer readable program instructions stored in memory 630 to perform the operations described above in connection with FIGS. 1-5.

Memory 630 may comprise computer readable storage media encoded with software comprising computer readable program instructions, and when the software is executed by the processor 620, the processor 620 is operable to perform the operations described herein in connection with attribute assignment, filtering, and display logic 635.

FIG. 7 shows an example of a plurality of tiled worksheets 710(1)-710(6), according to an embodiment of the present invention. As shown in this example, each tab of the worksheet is displayed in a tiled manner within the display window.

Figure 8:
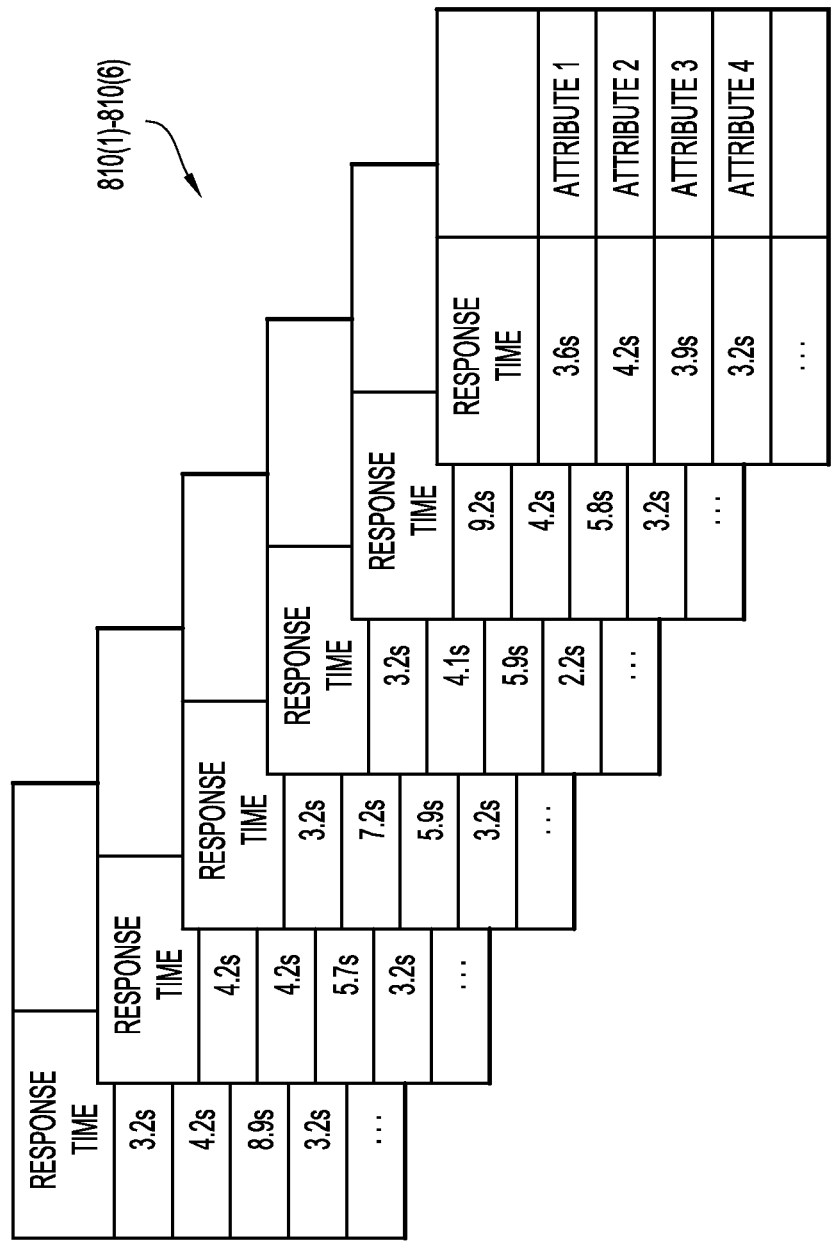
FIG. 8 shows an example of stacked worksheets, according to an embodiment of the present invention.

FIG. 8 shows an example of a plurality of stacked worksheets 810(1)-810(6), according to an embodiment of the present invention. As shown in this example, each tab of the worksheet is displayed in a stacked manner within the display window.

Present invention embodiments may also be extended to multiple spreadsheets. For example, attributes may be applied to multiple spreadsheets, and filtering may be performed across multiple worksheets from multiple spreadsheets, in order to identify relevant data for analysis.

It will be appreciated that the embodiments described above and illustrated in the drawings represent only a few of the many ways of implementing embodiments for.

The environment of the present invention embodiments may include any number of computer or other processing systems (e.g., client or end-user systems, server systems, data centers, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, attribute assignment module, filtering module, display module, etc.). These systems may include any types of monitors and input devices (e.g., keyboard, mouse, voice recognition, etc.) to enter and/or view information.

It is to be understood that the software (e.g., attribute assignment module, filtering module, display module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., attribute assignment module, filtering module, display module, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., collected data, attribute information, etc.). The database system may be implemented by any number of any conventional or other databases, data stores or storage structures (e.g., files, databases, data structures, data or other repositories, etc.) to store information (e.g., collected data, attribute information, etc.). The database system may be included within or coupled to the server and/or client systems. The database systems and/or storage structures may be remote from or local to the computer or other processing systems, and may store any desired data (e.g., collected data, attribute information, etc.).

The present invention embodiments may employ any number of any type of user interface (e.g., Graphical User Interface (GUI), command-line, prompt, etc.) for obtaining or providing information (e.g., attributes, filtered worksheets, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

Display results may include any information arranged in any fashion, and may be configurable based on rules or other criteria to provide desired information to a user (e.g., text analytics, attribute information, filtering criteria, etc.).

The present invention embodiments are not limited to the specific tasks or algorithms described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of accessing data within a spreadsheet including a plurality of worksheets comprising:
    assigning a set of a plurality of attributes to each worksheet within the spreadsheet, wherein the set of attributes for a corresponding worksheet describes a type of data in that worksheet;
    processing a request for data within the spreadsheet to identify one or more worksheets containing the data from among the plurality of worksheets by comparing the set of attributes for each worksheet to one or more attributes specified within the request, wherein the set of attributes for each identified worksheet satisfies the comparison; and
    displaying a portion of the spreadsheet including only the identified worksheets.

2. The computer-implemented method of claim 1, wherein displaying the identified worksheets further comprises: displaying the identified worksheets in accordance with a user-specified arrangement.

3. The computer-implemented method of claim 2, wherein the user-specified arrangement includes one of a single window, plural tiled windows, and plural stacked windows.

4. The computer-implemented method of claim 1, further comprising:
    ordering the identified worksheets in accordance with a specified set of conditions.

5. The computer-implemented method of claim 1, further comprising;
    accessing data within multiple spreadsheets by assigning a set of attributes to each worksheet of a plurality of spreadsheets;
    identifying one or more worksheets of the plurality of spreadsheets by comparing the set of attributes for each worksheet to one or more attributes specified within a request for data; and
    displaying the identified worksheets.

6. The computer-implemented method of claim 1, wherein the set of attributes includes a tag.

7. The computer-implemented method of claim 1, wherein the set of attributes includes a key-value pair.

* * * * *